(12) United States Patent
Charlon

(10) Patent No.: US 9,960,803 B2
(45) Date of Patent: May 1, 2018

(54) MIMO ANTENNA LEAKAGE CANCELLER SYSTEM

(71) Applicant: Maxim Integrated Products, Inc., San Jose, CA (US)

(72) Inventor: Olivier Charlon, San Francisco, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 198 days.

(21) Appl. No.: 14/883,020

(22) Filed: Oct. 14, 2015

(65) Prior Publication Data

US 2016/0119020 A1    Apr. 28, 2016

Related U.S. Application Data

(60) Provisional application No. 62/068,904, filed on Oct. 27, 2014.

(51) Int. Cl.
*H04B 1/525* (2015.01)
*H04B 1/12* (2006.01)
*H04B 7/0413* (2017.01)

(52) U.S. Cl.
CPC ............ *H04B 1/525* (2013.01); *H04B 1/123* (2013.01); *H04B 7/0413* (2013.01)

(58) Field of Classification Search
CPC ....... H04B 1/525; H04B 1/123; H04B 7/0413
See application file for complete search history.

(56) References Cited

U.S. PATENT DOCUMENTS

| 2009/0213770 A1* | 8/2009 | Mu | H04B 1/123 370/281 |
|---|---|---|---|
| 2015/0078226 A1* | 3/2015 | Charlon | H04B 1/525 370/290 |

* cited by examiner

*Primary Examiner* — Siming Liu

(57) ABSTRACT

A system includes a first duplexer that receives samples of a signal transmitted from a first transmit portion of a communication device and outputs a filtered signal based on sampled transmitted signal. A first modulator adjusts the filtered signal based on at least one of a phase, amplitude, and delay of leakage associated with the transmitted signal. The leakage corresponds to leakage from the first transmit portion of the communication device to a first receive portion of the communication device. The first modulator provides a leakage cancellation signal based on the adjusted filtered signal. A first coupler subtracts the leakage cancellation signal from a signal received by the first receive portion of the communication device.

20 Claims, 6 Drawing Sheets

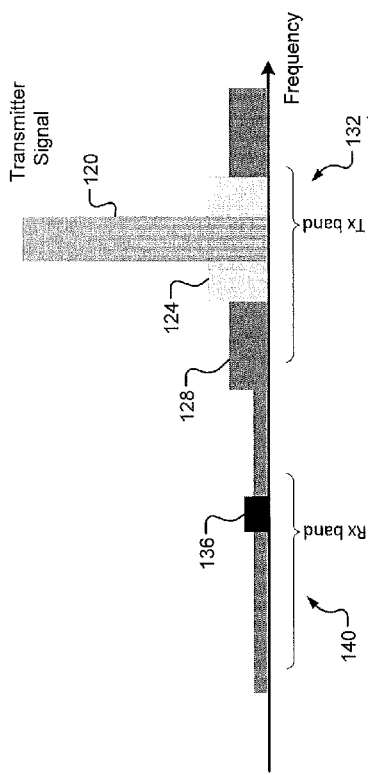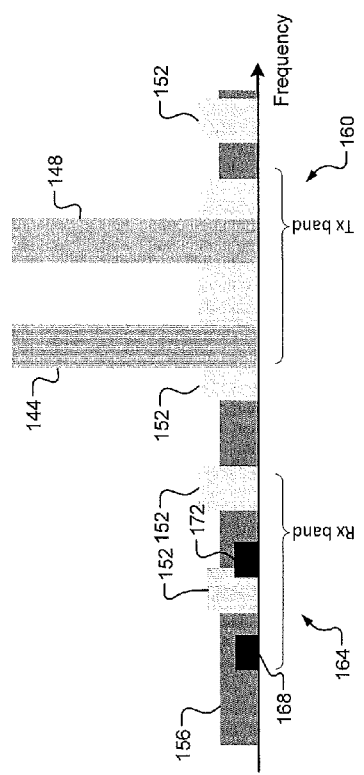

MIMO ANTENNA LEAKAGE CANCELLER SYSTEM

CROSS-REFERENCE TO RELATED APPLICATIONS

This application claims the benefit of U.S. Provisional Application No. 62/068,904, filed on Oct. 27, 2014. The entire disclosure of the application referenced above is incorporated herein by reference.

FIELD

The present disclosure relates to systems and methods for cancelling coupling in a device with multiple antennas.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A communication device (e.g., a mobile telephone) may include a single antenna for transmitting and receiving signals, or multiple antennas for transmitting and receiving signals, such as in a multiple in multiple out (MIMO) arrangement. The MIMO arrangement may include full division duplex (FDD) operation.

A single antenna may communicate with a duplexer that allows the antenna to function as both a receiver antenna and a transmitter antenna. For example, the duplexer selectively connects the antenna to a receiver portion of the device and a transmitter portion of the device. Insufficient (e.g., limited) isolation between the receiver portion and the transmitter portion, at the duplexer, allows coupling to occur between adjacent antennas (e.g., between a transmit frequency band and an adjacent receive frequency band). Accordingly, a single transmitter can impair operation of one or more receivers in the device.

For example, transmitter carrier leakage may interfere with operation of a low-noise amplifier (LNA) of the receiver portion, and may cause distortion, saturation, cross modulation, compression, etc. The interference may further lead to stringent receiver linearity (e.g., linearization that prevents transmit noise from being filtered prior to a power amplifier in the receive frequency band). The transmitter may also cause additive interference with the receiver portion, such as added transmitter noise, residual intermodulation products (IMs), spurs, etc. in the receive frequency band. Consequently, the receiver portion may be desensitized and power consumption of various components of the transceiver portion may be increased.

FIGS. 1A, 1B, and 1C show an example system 100 including a single antenna 104 for transmitting and receiving signals. The antenna 104 communicates with a duplexer 108, which is configured to provide communication, via respective ports of the duplexer 108, between a receiver portion 112 and a transmitter portion 116. As shown in a single carrier implementation with no linearization in FIG. 1B, a transmitter signal 120 generates transmitter IMs 124 and transmitter noise 128 (which is filtered by a zero intermediate frequency, or ZIF, reconstruction filter) in a transmit frequency band 132. However, minimal interference with a desired receive signal 136 occurs in a receive frequency band 140.

Conversely, in a multi-carrier implementation as shown in FIG. 1C, transmitter signals 144 and 148 generate transmitter IMs 152 and transmitter noise leakage 156 in both a transmit frequency band 160 and a receive frequency band 164, causing interference with desired receive signals 168 and 172.

FIG. 2 shows another example system 200. The system 200 corresponds to a 2×2 MIMO implementation including a first antenna 204 in communication with a first receiver portion 208 and a first transmitter portion 212 via respective ports of a first duplexer 216, and a second antenna 220 in communication with a second receiver portion 224 and a second transmitter portion 228 via respective ports of a second duplexer 232. Limited isolation (as indicated by the arrows) is present between the first antenna 204 and the second antenna 220). Nonetheless (e.g., by virtue of the distance between the first antenna 204 and the second antenna), this limited isolation may not prevent a transmitter (e.g., the first transmitter portion 212) from desensitizing a receiver (e.g., the second receiver portion 224).

Coupling between antennas (and corresponding transmitter and receiver portions) becomes more complicated in a 4×4 MIMO implementation, as shown in another example system 300 in FIG. 3. The system 300 includes a first antenna 304 in communication with a first receiver portion 308 and a first transmitter portion 312 via respective ports of a first duplexer 316, and a second antenna 320 in communication with a second receiver portion 324 and a second transmitter portion 328 via respective ports of a second duplexer 332. The system 300 further includes a third antenna 336 in communication with a third receiver portion 340 and a third transmitter portion 344 via respective ports of a third duplexer 348, and a fourth antenna 352 in communication with a fourth receiver portion 356 and a fourth transmitter portion 360 via respective ports of a fourth duplexer 364. Limited isolation (as indicated by the arrows) is present between various antennas and corresponding receiver and transmitter portions.

Various systems and methods may be used to isolate the receiver portions from the transmitter portions as shown in FIGS. 1-3. In one example, a passive ceramic or air cavity duplexer having a high transmit antenna attenuation and high transmitter-receiver isolation is used to prevent excessive leakage to the receiver. In another example, an active canceller implements a mixer to down convert an output of a transmitter power amplifier to a lower frequency. An output of the mixer is digitized with an analog to digital converter (ADC). An output of the ADC is equalized to match a delay, amplitude, and phase of the leakage via the duplexer and corresponding antenna. A digital signal processing system extracts a correlation between the transmitter leakage and the digitized power amplifier output to determine equalizer coefficients. A second path may be used to transmit the carrier leakage at the receiver LNA to prevent distortion and/or saturation. In still another example, radio frequency (RF) domain cancellation may be used.

SUMMARY

A system includes a first duplexer that receives samples of a signal transmitted from a first transmit portion of a communication device and outputs a filtered signal based on sampled transmitted signal. A first modulator adjusts the filtered signal based on at least one of a phase, amplitude, and delay of leakage associated with the transmitted signal. The leakage corresponds to leakage from the first transmit portion of the communication device to a first receive portion of the communication device. The first modulator provides a leakage cancellation signal based on the adjusted filtered signal. A first coupler subtracts the leakage cancellation signal from a signal received by the first receive portion of the communication device.

A method includes sampling a signal transmitted from a first transmit portion of a communication device, filtering the sampled transmitted signal, and adjusting the filtered signal based on at least one of a phase, amplitude, and delay of leakage associated with the transmitted signal. The leakage corresponds to leakage from the first transmit portion of the communication device to a first receive portion of the communication device. The method further includes providing a leakage cancellation signal based on the adjusted filtered signal and subtracting the leakage cancellation signal from a signal received by the first receive portion of the communication device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is an example system including a single antenna for transmitting and receiving signals;

FIG. 1B illustrates interference generated by a transmit signal at a receiver input in a single carrier implementation;

FIG. 1C illustrates interference generated by a transmit signal at a receiver input in a multi-carrier implementation;

In the drawings, reference numbers may be reused to identify similar and/or identical elements.

DETAILED DESCRIPTION

Figure 2:
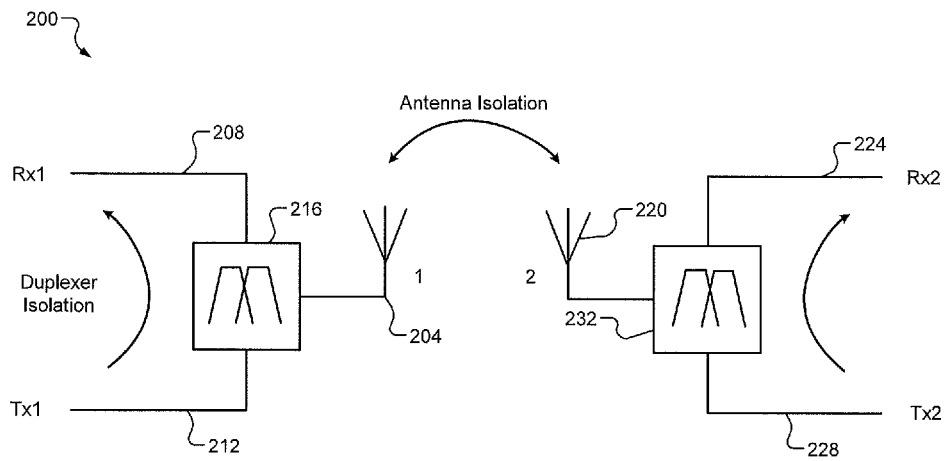
FIG. 2 is an example system including multiple antennas for transmitting and receiving signals.
Figure 3:
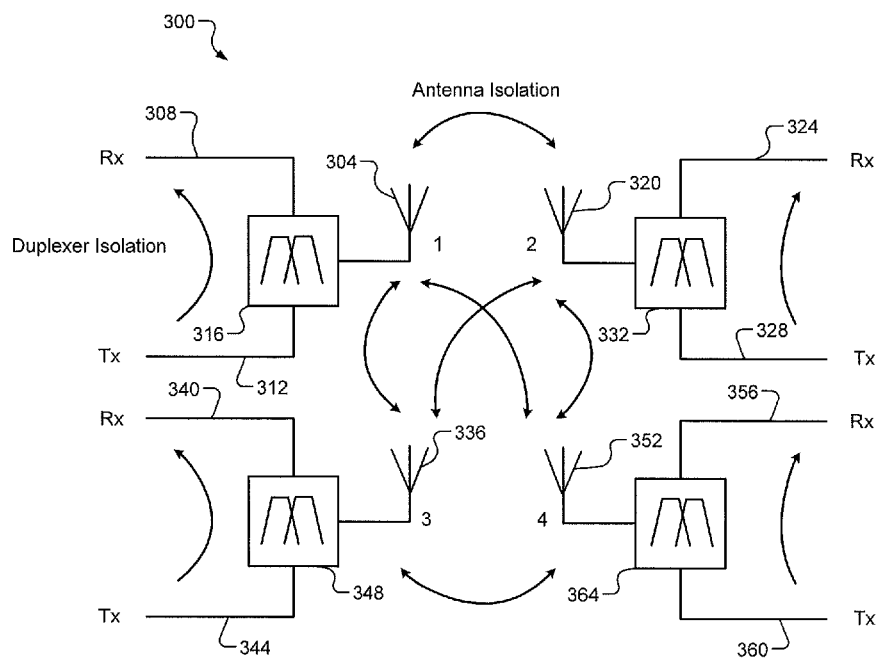
FIG. 3 is another example system including multiple antennas for transmitting and receiving signals.

Systems and methods used to isolate receiver portions from transmitter portions in MIMO systems may have various limitations. For example, passive ceramic or air cavity duplexers are costly and bulky, and are not desirable for space-constrained and low cost applications, such as in long term evolution (LTE) small-cell devices. As another example, an active canceller implementing a mixer requires complex signal processing, resulting in increased power consumption and increased cost, and also requires two cancellation paths (e.g., one cancellation path for receiver frequencies and one cancellation path for transmitter frequencies). Similarly, RF domain cancellation also requires complex signal processing and two cancellation paths.

Antenna leakage cancellation systems and methods according to the principles of the present disclosure perform cancellation of coupling between closely-located antenna elements. For example only, the systems and methods described herein may be implemented in applications where one transmitter may interfere with several receivers due to limited antenna isolation (e.g., FDD MIMO systems). The antenna leakage cancellation systems and methods implement a combination of passive and active cancellation resulting in decreased power consumption, cost, and size for implementation in FDD MIMO systems and other small-cell devices. For example only, an active portion of the antenna leakage cancellation system may by less than 3×3 mm, and power consumption less than 60 mW for a 4×4 MIMO.

For example, the antenna leakage cancellation systems and methods determine a delay, phase, and/or gain (e.g., amplitude) of leakage of a transmit signal originating at a transmitter portion of a communication device. A duplexer is arranged to receive samples of the transmit signal and a modulator adjusts the signal according to the determined delay, phase, and/or gain of the leakage. In other words, the modulator adjusts the transmit signal to generate a duplicate of the leakage of the transmit signal. The duplicate of the leakage is provided to a coupler at a receiver portion of the communication device. The coupler subtracts the leakage from a received signal.

Referring now to FIG. 4A, an example antenna leakage cancellation system 400 is shown in a 2×2 MIMO implementation. The system 400 includes a first antenna 404 in communication with a first receiver portion 408 and a first transmitter portion 412 via respective ports of a first duplexer 416, and a second antenna 420 in communication with a second receiver portion 424 and a second transmitter portion 428 via a second duplexer 432.

A coupler 436 (e.g., a low loss directional coupler) samples a transmit signal output (e.g., corresponding to the power amplifier output) and provides the sampled transmit signal to a transmit port of duplexer 440, which functions as a duplexer transmit filter. For example, the duplexer 440 is configured to have a same transfer function as that of the duplexer 416. An output (e.g., a filtered signal) of the duplexer 440 is provided, via an antenna port, to a phase, amplitude, and delay (PAD) modulator 444. The PAD modulator 444 is configured according to the determined phase, amplitude, and delay of leakage from the transmit portion 412 to the receive portion 424 (i.e., a leakage signal). For example, the leakage may be measured during manufacture of the communication device, and the PAD modulator 444 is calibrated according to the corresponding phase, amplitude, and delay of the measured leakage.

Alternatively, the system 400 may include a PAD determination module 448 configured to determine the phase, amplitude, and delay of the leakage using one or more methods. For example, the PAD determination module 448 may implement methods including, but not limited to, adaptive algorithms, search algorithms, lookup tables corresponding to various operating conditions (e.g., temperature) of the system 400, derating according to temperature, digital signal processing, etc. The PAD determination module 448 may be included in the system 400 (e.g., in a system on a chip) or may be external to the system 400.

Accordingly, the PAD modulator 444 is configured to adjust the transmit signal according to the determined phase, amplitude, and delay of the leakage, and output a leakage cancellation signal that corresponds to a duplicate of the leakage from the antenna 404 to the antenna 420. An antenna port of a duplexer 452 (functioning as a duplexer receive filter) having a same transfer function as duplexer 432 receives the leakage cancellation signal and provides the leakage cancellation signal, via a receive port of the duplexer 452, to a coupler 456 (e.g., a low loss directional coupler). The coupler 456 subtracts the leakage cancellation signal from a receive signal received at the receiver portion 424, thereby effectively removing the leakage from signals received at the antenna 420.

Similarly, a coupler 460 (e.g., a low loss directional coupler) samples a transmit signal output (as indicated by "Tx" in FIG. 4A) and provides the sampled transmit signal to a transmit port of duplexer 464, which functions as a duplexer transmit filter. For example, the duplexer 464 is configured to have a same transfer function as that of the duplexer 432. An output of the duplexer 464 is provided, via an antenna port of the duplexer 464, to a PAD modulator 468. The PAD modulator 468 is configured according to the determined phase, amplitude, and delay of leakage from the transmit portion 428 to the receive portion 408.

Accordingly, the PAD modulator 468 is configured to adjust the transmit signal according to the determined phase, amplitude, and delay of the leakage, and output a leakage cancellation signal that corresponds to a duplicate of the leakage from the antenna 420 to the antenna 404. An antenna port of a duplexer 472 (functioning as a duplexer receive filter) having a same transfer function as duplexer 416 receives the leakage cancellation signal and provides the leakage cancellation signal, via a receive port of the duplexer 472, to a coupler 476 (e.g., a low loss directional coupler). The coupler 476 subtracts the leakage cancellation signal from a receive signal received at the receiver portion 408, thereby removing the leakage from signals received at the antenna 404.

Referring now to FIG. 4B, an example of the PAD modulator 444 is shown in more detail. The PAD modulator 444 includes a delay control module 478, a phase control module 480, and an amplitude control module 482. The delay control module 478 includes a plurality of delay elements δ1, δ2, . . . , δn, referred to collectively as delay elements δ, and a switch S. The switch S selects a desired one of the delay elements δ to provide a variable delay. For example, the delay elements δ may correspond to respective amplifiers having different delays or bandwidths. Accordingly, the delay control module 478 receives a filtered signal corresponding to the output of the duplexer 440 and applies the selected delay to the filtered signal according to the determined delay of the measured leakage. For example, the selected delay may correspond to the same delay as a delay of the measured leakage.

The phase control module 480 adjusts a phase of the delayed filtered signal according to the determined phase of the measured leakage. For example, the phase control module 480 may adjust the phase to a phase opposite of the measured leakage (e.g., by 180°). The phase control module 480 may include a quadrature phase shifter (QPS) 484, variable gain amplifiers 486 and 488 for amplifying respective outputs (e.g. outputs 90° apart) of the QPS 484, and a summing node 490. In examples, the phase control module 480 may implement a vector modulator to provide a variable phase.

The amplitude control module 482 adjusts the amplitude of the delayed and phase adjusted filtered signal using, for example, a variable gain amplifier 492 to output the leakage cancellation signal. The amplitude control module 482 adjusts the amplitude based on the determined amplitude of the measured leakage. For example, the adjusted amplitude may correspond to the same amplitude as the amplitude of the measured leakage. Accordingly, the leakage cancellation signal has the same delay and amplitude as the measured leakage but a phase opposite to the phase of the measured leakage.

Figure 5:
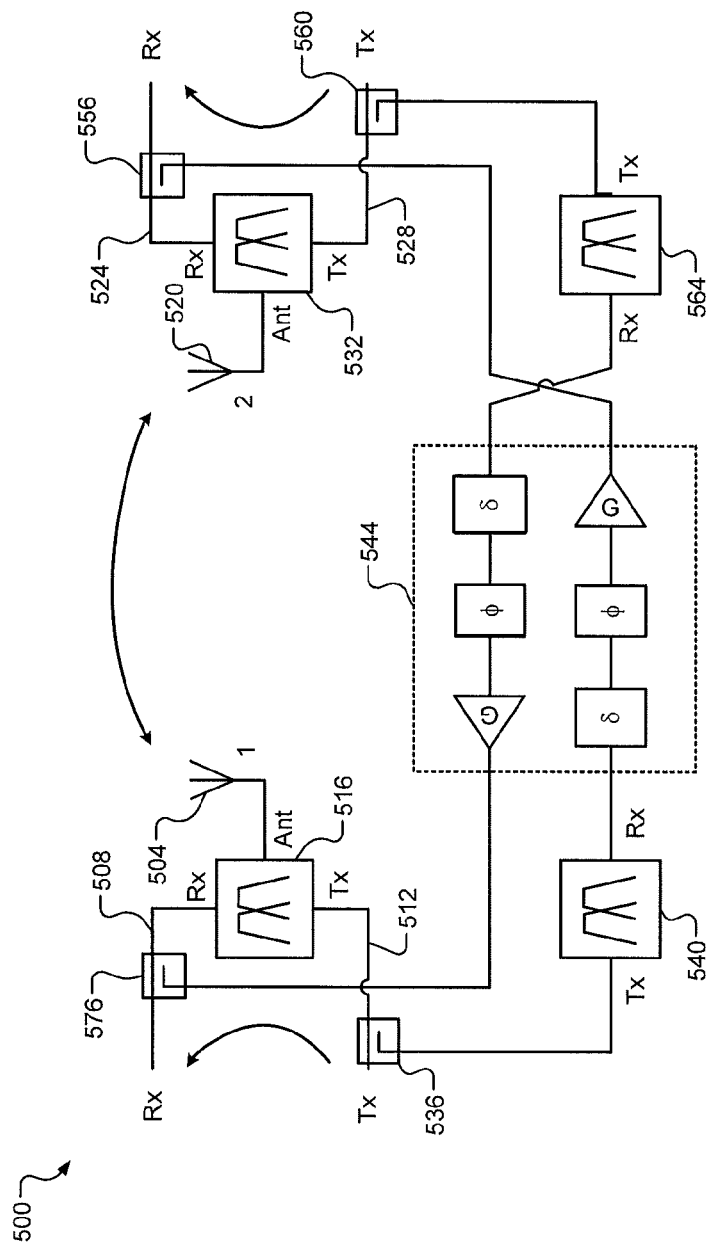
FIG. 5 is another example antenna leakage cancellation system according to the principles of the present disclosure.

Referring now to FIG. 5, another example antenna leakage cancellation system 500 is shown in a 2×2 MIMO implementation. The system 500 includes a first antenna 504 in communication with a first receiver portion 508 and a first transmitter portion 512 via respective ports of a first duplexer 516, and a second antenna 520 in communication with a second receiver portion 524 and a second transmitter portion 528 via a second duplexer 532.

A coupler 536 (e.g., a low loss directional coupler) samples a transmit signal output from the duplexer 516 and provides the sampled transmit signal to a transmit port of duplexer 540, which functions as a duplexer transmit and receive filter. For example, the duplexer 540 is configured to have a same transfer function as that of the duplexer 516. However, unlike the duplexer 440 of FIG. 4A, the duplexer 540 is configured to provide both transmit and receive filtering. Accordingly, an output of the duplexer 540 is provided via a receive port of the duplexer 540 (instead of the antenna port as described in FIG. 4A). The output is provided to a PAD modulator 544. The PAD modulator 544 is configured according to the determined phase, amplitude, and delay of leakage from the transmit portion 512 to the receive portion 524. For example, the leakage may be measured during manufacture of the communication device and/or determined using the PAD determination module 448 as shown in FIG. 4A. An additional duplexer to perform duplexer receive filtering at an output of the PAD modulator 544 is not required because the duplexer 540 is configured to perform the duplexer receive filtering.

Accordingly, the PAD modulator 544 is configured to adjust the transmit signal according to the determined phase, amplitude, and delay of the leakage, and output a leakage cancellation signal that corresponds to a duplicate of the leakage from the antenna 504 to the antenna 520. The leakage cancellation signal is provided to a coupler 556 (e.g., a low loss directional coupler). The coupler 556 subtracts the leakage cancellation signal from a receive signal received at the receiver portion 524, thereby removing the leakage from signals received at the antenna 520.

Similarly, a coupler 560 (e.g., a low loss directional coupler) samples a transmit signal output (as indicated by "Tx" in FIG. 5) and provides the sampled transmit signal to a transmit port of duplexer 564, which functions as a duplexer transmit and receive filter. For example, the duplexer 564 is configured to have a same transfer function as that of the duplexer 532. An output of the duplexer 564 is provided, via a receive port of the duplexer 564, to the PAD modulator 544. The PAD modulator 544 is configured according to the determined phase, amplitude, and delay of leakage from the transmit portion 528 to the receive portion 508.

Accordingly, the PAD modulator 544 is configured to adjust the transmit signal according to the determined phase, amplitude, and delay of the leakage, and output a leakage cancellation signal that corresponds to a duplicate of the leakage from the antenna 520 to the antenna 504. The leakage cancellation signal is provided to a coupler 576 (e.g., a low loss directional coupler). The coupler 576 subtracts the leakage cancellation signal from a receive signal received at the receiver portion 508, thereby removing the leakage from signals received at the antenna 504.

Figure 6:
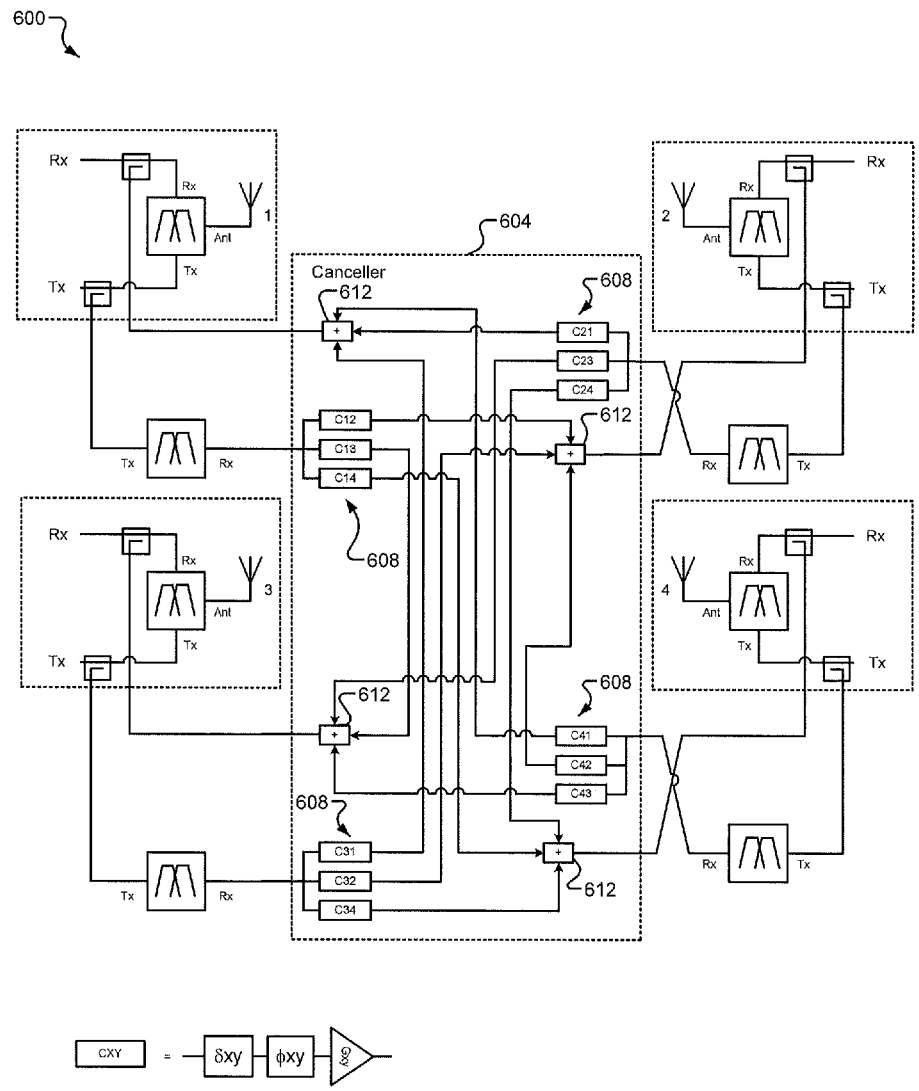
FIG. 6 is another example antenna leakage cancellation system according to the principles of the present disclosure.

Referring now to FIG. 6, an example antenna leakage cancellation system 600 is shown in a 4×4 MIMO implementation. The system 600 operates in a manner analogous to the systems 400 and 500 to cancel leakage between various antennas using duplexers configured to perform both transmit and receive filtering as described in FIG. 5. However, additional duplexers as shown in FIG. 4A may be used.

Figure 4:
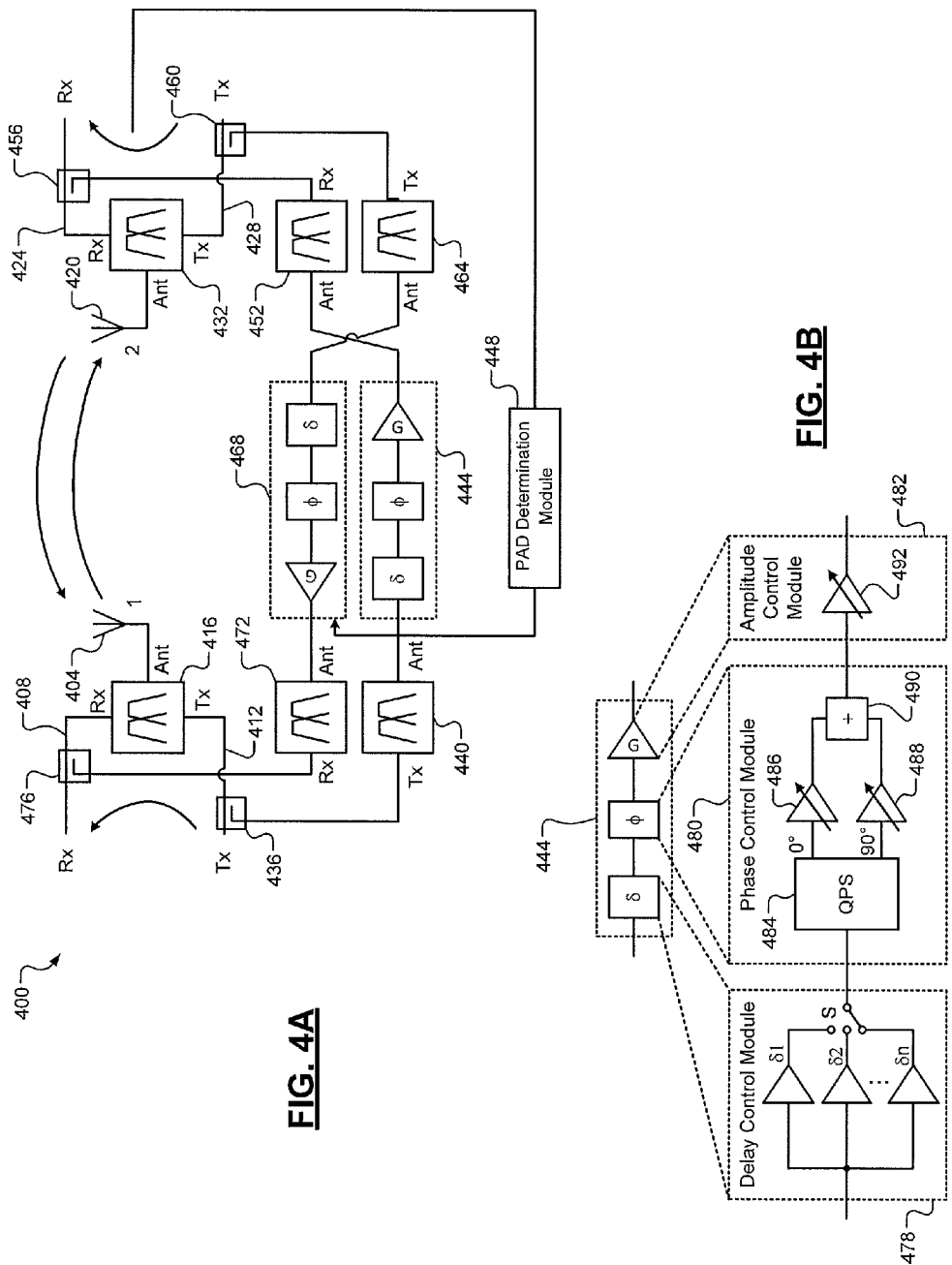
FIG. 4A is an example antenna leakage cancellation system according to the principles of the present disclosure.
FIG. 4B is an example phase amplitude delay (PAD) modulator according to the principles of the present disclosure.

A leakage canceller 604 includes a plurality of PAD modulators 608 configured to operate as described in FIGS. 4 and 5. However, leakage cancellation signals from each of the PAD modulators 608 may be combined such that the combined leakage cancellation signals from three transmitting antennas is removed from each receiving antenna (e.g., using respective summing nodes 612). In this manner, leakage from each of the other antennas in the system 600 can be removed from a respective antenna receiving a signal.

Figure 7:
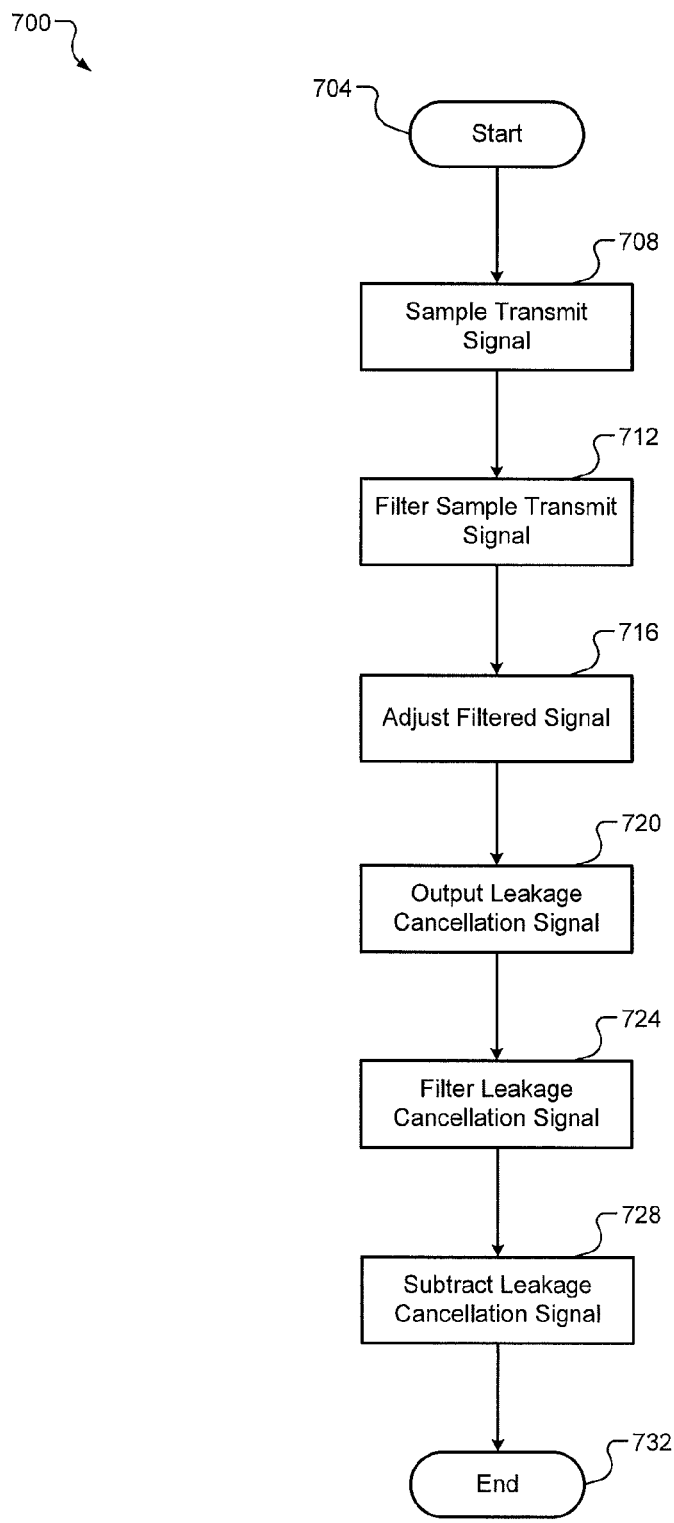
FIG. 7 is an example antenna leakage cancellation method according to the principles of the present disclosure.

Referring now to FIG. 7, an example antenna leakage cancellation method 700 begins at 704. At 708, the method 700 samples a transmit signal. For example, the method 700 samples the transmit signal using a low loss directional coupler. At 712, the method 700 filters the sampled transmit signal. For example, the method 700 filters the signal using a duplexer configured to perform transmit filtering. At 716, the method 700 adjusts the filtered signal according to a determined phase, amplitude, and delay associated with the transmit signal. For example, the phase, amplitude, and delay associated with the transmit signal may be calibrated according to measured leakage from the transmit signal to a receive antenna. At 720, the method 700 outputs a leakage cancellation signal based on the phase, amplitude, and delay associated with the transmit signal. At 724, the method 700 filters the leakage cancellation signal. For example, the method 700 filters the leakage cancellation signal using a duplexer configured to perform receive filtering. At 728, the method 700 subtracts the leakage cancellation signal from a signal received at the receive antenna. For example, the method 700 subtracts the leakage cancellation signal using a low loss directional coupler. The method ends at 732.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii)

object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a first duplexer that receives samples of a signal transmitted, via a second duplexer, from a first transmit portion of a communication device and outputs a filtered signal based on the sampled transmitted signal;
   a first modulator that receives the filtered signal from the first duplexer, that adjusts the filtered signal based on at least one of a phase, amplitude, and delay of leakage associated with the transmitted signal, wherein the leakage corresponds to leakage from the first transmit portion of the communication device to a first receive portion of the communication device, and that provides a leakage cancellation signal based on the adjusted filtered signal; and
   a first coupler that subtracts the leakage cancellation signal from a signal received by the first receive portion of the communication device.

2. The system of claim 1, further comprising a plurality of antennas in a multiple in multiple out (MIMO) arrangement.

3. The system of claim 2, wherein the first transmit portion communicates with a first antenna of the plurality of antennas and the first receive portion communicates with a second antenna of the plurality of antennas.

4. The system of claim 1, wherein the first duplexer and the second duplexer have a same transfer function.

5. The system of claim 4, further comprising a second coupler that samples the transmitted signal as provided by the second duplexer and provides the samples to the first duplexer.

6. The system of claim 1, further comprising a phase amplitude delay (PAD) determination module that determines the phase, the amplitude, and the delay of the leakage and provides the determined phase, amplitude, and delay to the first modulator.

7. The system of claim 1, wherein, to adjust the filtered signal, the first modulator adjusts at least one of the phase, the amplitude, and the delay of the filtered signal based on the at least one of the phase, the amplitude, and the delay of the leakage.

8. The system of claim 7, wherein a delay and an amplitude of the leakage cancellation signal are approximately equal to the delay and the amplitude of the leakage, and wherein a phase of the leakage cancellation signal is opposite to a phase of the leakage.

9. The system of claim 8, wherein, to subtract the leakage cancellation signal from the received signal, the first coupler combines (i) the received signal with (ii) the leakage cancellation signal having the phase opposite to the phase of the leakage.

10. The system of claim 1, wherein the first modulator comprises:
    a delay control module that selects a delay of the leakage cancellation signal;
    a phase control module that adjusts a phase of the leakage cancellation signal; and
    an amplitude control module that adjusts an amplitude of the leakage cancellation signal.

11. A method comprising:
    sampling a signal transmitted from a first transmit portion of a communication device;
    filtering the sampled transmitted signal, wherein filtering the sampled transmitted signal includes using a first duplexer to filter the sampled transmitted signal, and wherein the signal is transmitted from the first transmit portion using a second duplexer;
    receiving the filtered signal from the first duplexer and adjusting the filtered signal based on at least one of a phase, amplitude, and delay of leakage associated with the transmitted signal, wherein the leakage corresponds to leakage from the first transmit portion of the communication device to a first receive portion of the communication device;
    providing a leakage cancellation signal based on the adjusted filtered signal; and
    subtracting the leakage cancellation signal from a signal received by the first receive portion of the communication device.

12. The method of claim 11, further comprising arranging a plurality of antennas in a multiple in multiple out (MIMO) arrangement.

13. The method of claim 12, further comprising communicating with a first antenna of the plurality of antennas using the first transmit portion and communicating with a second antenna of the plurality of antennas using the first receive portion.

14. The method of claim 11, wherein the second duplexer has a same transfer function as the first duplexer.

15. The method of claim 14, wherein sampling the transmitted signal includes sampling the transmitted signal as provided by the second duplexer and providing the samples to the first duplexer.

16. The method of claim 11, further comprising determining the phase, the amplitude, and the delay of the leakage.

17. The method of claim 11, wherein adjusting the filtered signal includes adjusting at least one of the phase, the amplitude, and the delay of the filtered signal based on the at least one of the phase, the amplitude, and the delay of the leakage.

18. The method of claim 17, wherein a delay and an amplitude of the leakage cancellation signal are approximately equal to the delay and the amplitude of the leakage, and wherein a phase of the leakage cancellation signal is opposite to a phase of the leakage.

19. The method of claim 18, wherein subtracting the leakage cancellation signal from the received signal includes combining (i) the received signal with (ii) the leakage cancellation signal having the phase opposite to the phase of the leakage.

20. The method of claim 11, further comprising:
    selecting a delay of the leakage cancellation signal;
    adjusting a phase of the leakage cancellation signal; and
    adjusting an amplitude of the leakage cancellation signal.

* * * * *